(No Model.) 3 Sheets—Sheet 1.

J. GIBBONS.
GAS COOKING STOVE.

No. 462,923. Patented Nov. 10, 1891.

Fig 3ᵃ

WITNESSES:
Walter H. Babcock
Lewis G. Clark

INVENTOR:
James Gibbons
BY
Charles M. Bomeisler
ATTORNEY

THE NORRIS PETERS CO., PHOTO-LITHO., WASHINGTON, D. C.

(No Model.) 3 Sheets—Sheet 2.

J. GIBBONS.
GAS COOKING STOVE.

No. 462,923. Patented Nov. 10, 1891.

WITNESSES:

INVENTOR:
James Gibbons
BY
Charles M. Bomeisler.
ATTORNEY.

(No Model.) 3 Sheets—Sheet 3.

J. GIBBONS.
GAS COOKING STOVE.

No. 462,923. Patented Nov. 10, 1891.

WITNESSES:
Walter A. Babcock
Lewis G. Clark

INVENTOR:
James Gibbons
BY
Charles M. Bomeisler
ATTORNEY

UNITED STATES PATENT OFFICE.

JAMES GIBBONS, OF JERSEY CITY, NEW JERSEY, ASSIGNOR TO THE GIBBONS SUPERHEATING COMPANY, OF SAME PLACE.

GAS COOKING-STOVE.

SPECIFICATION forming part of Letters Patent No. 462,923, dated November 10, 1891.

Application filed April 27, 1891. Serial No. 390,637. (No model.)

*To all whom it may concern:*

Be it known that I, JAMES GIBBONS, of Jersey City, in the county of Hudson and State of New Jersey, have invented certain new and useful Improvements in Gas Cooking-Stoves, of which the following is a full, clear, and exact description.

My invention relates to that class of gas stoves or heaters known as "domestic stoves," and pertains more particularly to the special form or construction of the grated or skeleton stove-top on which cooking-vessels are placed for boiling, stewing, or frying food products, and to the peculiar construction and relative arrangement with the stove-body of the fluid-fuel burners of the stove.

One object of the invention is to facilitate easy and thorough cleaning of the stove-top, which is fitted with a removable grating.

A further object is to facilitate secure adjustment of the removable upper boiling-burners and to prevent "lighting back" of the lower broiling-burner and provide for easy dismemberment of it, whereby all the burners of the stove may be quickly, conveniently, and thoroughly cleaned and their most effective operation maintained.

The invention consists in certain novel features of construction and combinations of parts of the gas cooking-stove, all as hereinafter described and claimed.

Reference is to be had to the accompanying drawings, forming a part of this specification, and in which similar letters of reference indicate corresponding parts in all the figures.

Figure 1:
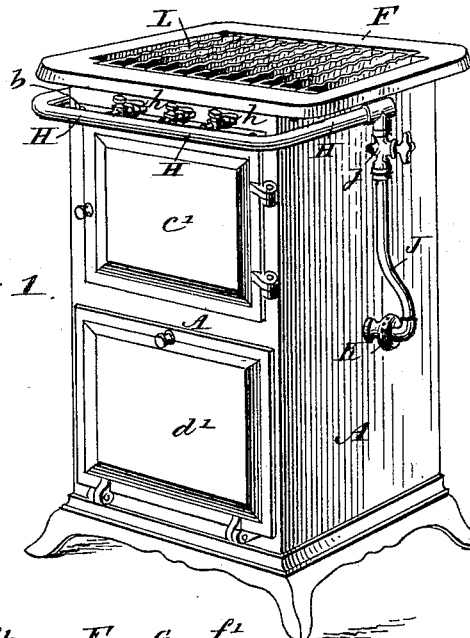
Figure 2:
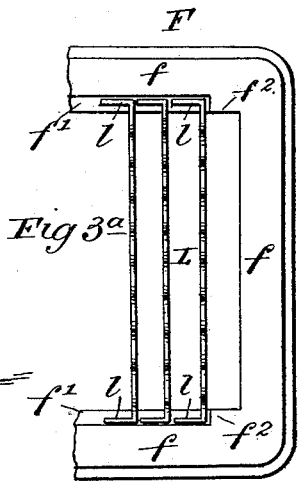
Figure 2:
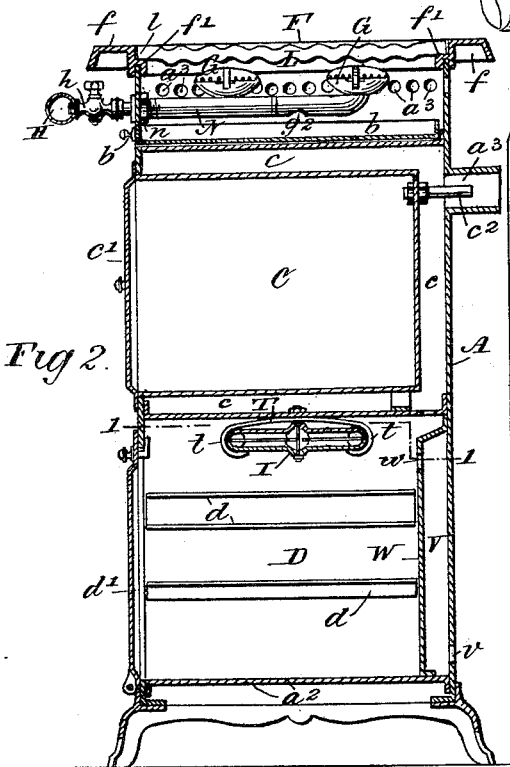
Figure 3:
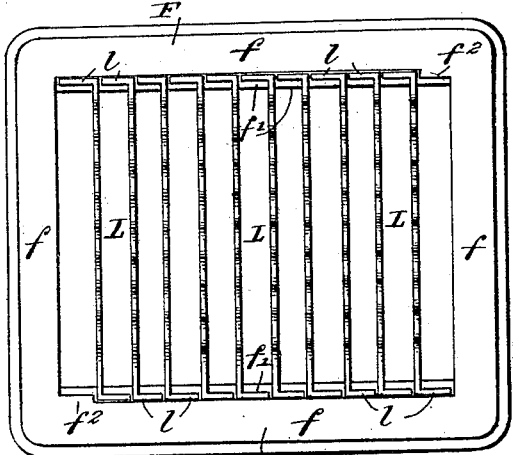
Figure 4:
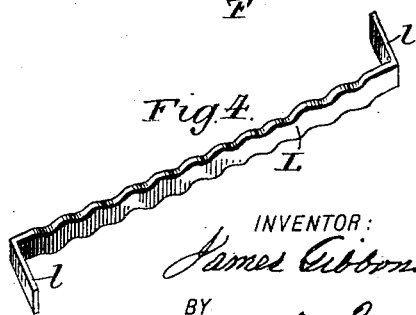
Figure 5:
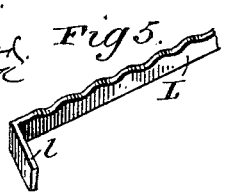
Figure 6:
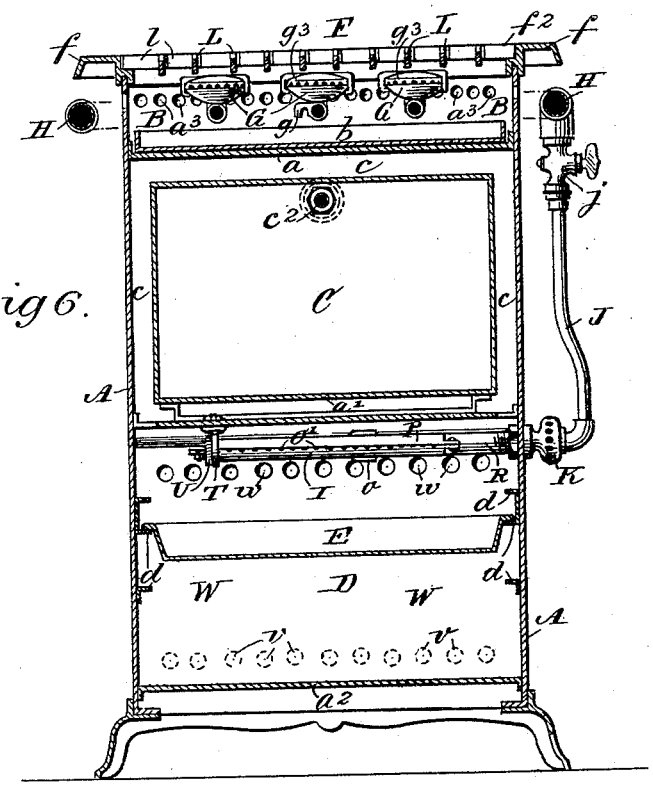
Figure 7:
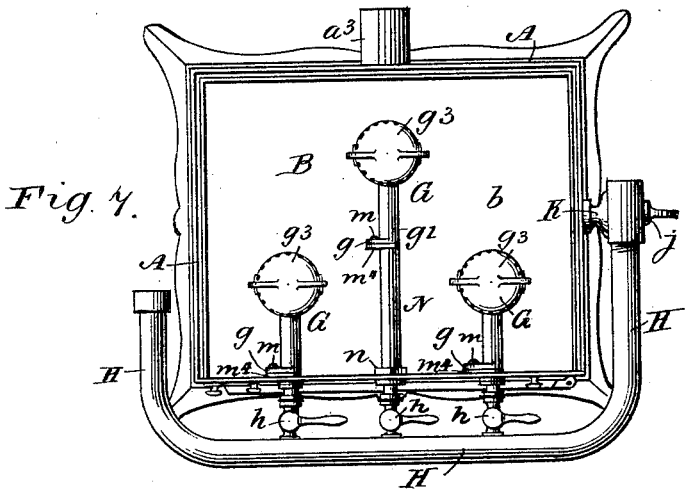
Figure 8:
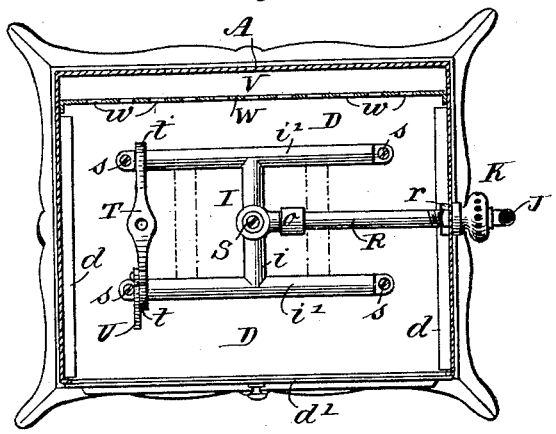
Figure 9:
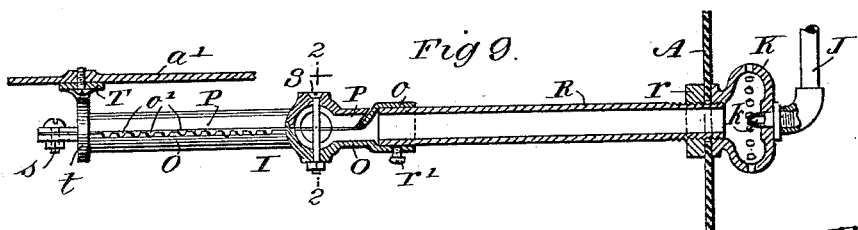
Figure 10:
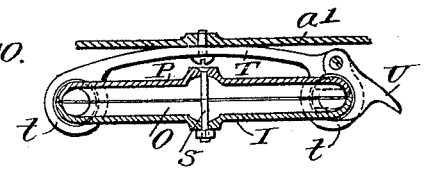
Figure 10A:
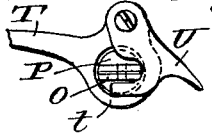
Figure 11:
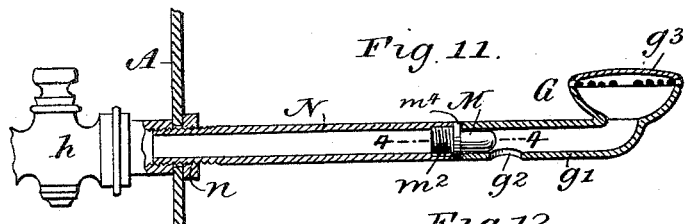
Figure 14:
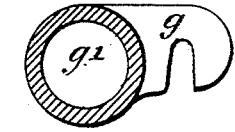
Figure 12:
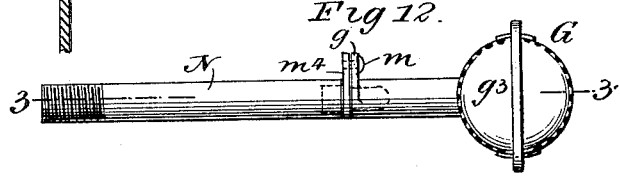
Figure 15:
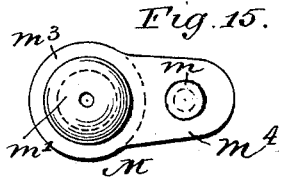
Figure 13:
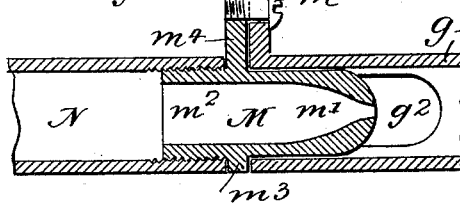

Figure 1 is a perspective view of my improved gas cooking-stove. Fig. 2 is a central vertical sectional side view thereof. Fig. 3 is a plan view of the stove-top. Fig. 3$^a$ is a detail view of a modification of the top. Fig. 4 is a perspective view of one desirable form of stove-top cross-bar. Fig. 5 is a detail view of a modification of this cross-bar. Fig. 6 is a front vertical sectional elevation of the stove. Fig. 7 is a plan view of the stove with its grated top removed. Fig. 8 is a plan view in horizontal section on the line 1 1 in Fig. 2, taken through the lower broiling or roasting chamber of the stove. Fig. 9 is an enlarged longitudinal sectional view of the lower broiling or roasting burner and its connections with the stove-body. Fig. 10 is a cross-section of said burner on the line 2 2 in Fig. 9. Fig. 10$^a$ is a detail view of the broiling-burner, bracket-support, and latch device. Fig. 11 is a longitudinal vertical section of the middle upper burner and its connections with the stove front, parts being in section on the line 3 3 in Fig. 12. Fig. 12 is a plan view of the middle upper burner. Fig. 13 is an enlarged detail horizontal section of said burner, taken on the line 4 4 in Fig. 11. Fig. 14 is a detail sectional view of one of the upper burners, and Fig. 15 is an outer end view of the gas nipple or tip used with the upper burners of the stove.

As regards its general construction the stove is made with an outer casing A, having an upper horizontal imperforate partition $a$, providing an upper burner chamber B, and an intermediate horizontal partition $a'$, cut away or perforated at its marginal parts and forming between it and the partition $a$ an intermediate chamber $c$, in which the baking-oven C is sustained centrally in the usual manner. Between the partition $a'$ and the imperforate bottom-plate $a^2$ of the casing is formed a lower broiling or roasting chamber D, within which a suitable pan E may be sustained at any desired height upon flanges $d$, fixed to the end walls of the casing or chamber. The oven C has a door $c'$, and the chamber D has a door $d'$, both doors fitted at the front of the casing.

Hot products from the improved lower broiling-burner (to be hereinafter particularly described) rise through the marginal openings in the partition $a'$ into the chamber $c$ around the oven C to heat it, and then escape at a flue-outlet $a^3$ of the casing, into or at which the ordinary oven-ventilator pipe $c^2$ also discharges. A sliding tray $b$ in the upper chamber B catches the drip from cooking vessels sustained on the improved top F of the casing, which will be hereinafter fully explained. The upper burners G, to be presently described, take a supply of gaseous fuel through suitable cocks $h$, connected to a tubular gas-supply rail H, while the lower broiling or roasting chamber burner I is supplied with gas through a pipe J, connected by its cock $j$ with the rail H, a suitable air-inlet bulb K being provided at the gas-inlet nipple $k$ at the lower end of the pipe J.

In more specially describing the novel features of my gas cooking-stove I will first particularly describe the construction of the stove-top F, then I will explain the peculiarities of the upper burners G and their fittings, and finally I will detail the construction of the improved lower broiling or roasting burner I of the apparatus.

A desirable construction of the stove-top F, with its cross-bar grating, is shown in Figs. 1, 3, 4, and 6 of the drawings. As here shown, the top comprises an open or marginal frame $f$, which at two opposite parts, preferably its front and rear, is rabbeted out to form two opposite depressed shoulders $f'$ $f'$, on which the laterally-bent or projected ends $l$ $l$ of the cross-bars L rest. As here shown, the opposite ends of the cross-bars project in opposite directions and the extremities of the intermediate bars abut end parts of next adjacent bars, while at two diagonally opposite corners of the inner opening of the top frame and within the rabbets there are provided filling-in pieces or parts $f^2$ $f^2$ of the metal, which correspond in length with the laterally-bent ends of the cross-bars and make final stops or lateral steadiments to the outside bars. I am not limited to this special form of cross-bar—as, for instance, I may bend or project the opposite ends of the top bars laterally in the same direction, as illustrated in Fig. $3^a$ of the drawings, and in this case the filling-pieces $f^2$ $f^2$ will both be at one end of the frame, instead of at diagonally-opposite corners thereof. Whether the opposite ends of the top bars be bent or project laterally in the same or in opposite directions, the bars have substantial support and are also maintained at even distances apart by their ends, and any one or more of the bars may at any time be lifted out of the frame to give access to any one or more of the top burners G which may become fouled to allow cleansing or renewal of it without disturbing the other cross-bars or the cooking vessels thereon, or the burners heating said vessels.

A specially good feature of the stove-top made as above described is that it can be very easily and thoroughly cleaned, because when the cross-bars L are removed the continuous rabbets or shoulders on which the bars rested may be quickly wiped off to remove dust or overflow or drip from the cooking vessels, as there are comparatively few sharp corners for the dust or drip to accumulate in and become inaccessible to a wiping-cloth. The bars themselves may also be easily cleaned and replaced on the cleansed frame.

Another distinct feature of construction consists in corrugating the upper edges of the cross-bars or forming alternating vertical recesses therein. I prefer to make the bars about an even width or depth throughout and corrugate both top and bottom edges of them, as shown in Figs. 2 and 4 of the drawings; but the top edges only of the bars may be so corrugated or recessed, as shown in Fig. 5 of the drawings. In any event the corrugated or recessed upper edges or surfaces of the cross-bars afford substantial support to boiling, stewing, or frying vessels over the top burners G and allow the burner-flames to have much more effective play directly against the bottoms of the vessels than would be possible with flat-topped cross-bars. I at present prefer to locate the bar-supporting shoulders $f'$ of the top frame to hold the top edges or faces of the cross-bars about flush with the upper face of said frame $f$. (See Figs. 1, 2, and 6 of the drawings.)

The upper burners G, as alone considered, embody but one improvement over a burner of like general character described in my recent application, Serial No. 369,584. This improvement consists in locating the slotted flange $g$, which engages a headed pin or a detent on the burner-support, at the side of the horizontally-disposed tubular stem or mixing-tube $g'$ of the burner instead of at the top or bottom of the stem. I find in practice that this changed location of the slotted flange $g$ at the back end of the burner-stem assures a more steady and satisfactory hold of the burner against axial turning on the gas-supply nipple M than when the flange is located at the top or bottom of the stem. Hence there is practically very little danger of the improved burner unshipping itself or turning on and falling from the nipple. This gas-supply nipple M has a hollow exteriorly-smooth nozzle $m'$, from which the gas issues, and an opposite screw-threaded end $m^2$, which is adapted to a supply pipe or cock. A collar $m^3$ between the parts $m'$ $m^2$ provides a two-way stop and is extended laterally at $m^4$, where it carries the pin $m$, which is engaged by the slotted or hook-flange $g$ on the burner-stem $g'$. Fig. 7 of the drawings shows that this nipple M, by screwing directly into the cock $h$ at the front of the stove-casing, provides for supporting the burner or burners G directly inside the casing, as the cock and nipple lock at opposite faces of the casing, while the burner-stem $g'$ is slipped onto the nipple-nozzle $m'$ and is then turned to engage the nipple-pin $m$ by its hooked or slotted flange $g$.

Figs. 2, 7, 11, 12, and 13 of the drawings illustrate how the rearmost burners G of a stove or range are sustained by screwing the threaded end $m^2$ of the burner-stem into the outer end of an auxiliary pipe N, the other end of which is screwed into the gas-supply cock $h$, and is preferably locked by a nut $n$ at the inside of the casing. It thus appears that the same gas-supply nipple M is adapted for use interchangeably either at the casing for connecting the burners directly to the cocks $h$ or with the auxiliary pipe N to hold the burner in required position farther from the main gas-supply rail of the stove. However the burner G may be connected by or through the nipple M to the gas-supply pipes, the opening $g^2$ in the burner-stem or mixing-tube $g'$ admits atmospheric air to commingle within the stem or tube with the gas entering the burner from the nipple to produce a clear blue flame. The removable flame-cap $g^3$ and its latching device are fully described in my prior application above named. Air-inlet holes $a^3$ in the casing A admit atmospheric air to the burners G to maintain combustion thereat should the stove-top be quite covered with cooking vessels.

The lower broiling or roasting burner I is made with an interior fluid-fuel channel or passage having, generally speaking, the form of a letter H, and which may be produced within two opposite tubular side parts connected by a central or intermediate cross-tube, which is coupled to the mixing-tube and forms an extension thereof, as hereinafter explained. This burner may be made of wrought-metal pipes or tubes bored to provide flame-apertures; but I prefer to make it more cheaply in two cast-metal upper and lower sections clamped together and then forming between or within them a gas or fluid-fuel channel or passage having two side portions connected intermediately of their preferably-closed ends by a cross channel or passage, which is preferably at the center of the burner. It will be understood that this cast-metal broiling-burner is not necessarily made in the H form shown, as the burner-body may have any desirable exterior form, provided the gas channel or passage be made with two opposite parts connected between their ends, and preferably at the centers, by a crossing channel or passage.

As shown in the drawings, the two cast-metal semi-tubular sections O P of the burner are joined horizontally, and one part, preferably the section O, is formed at the extremity of a projection from the central cross-tube $i$ with a complete collar or sleeve $o$, which is slip-jointed to the inner end of the burner mixing-tube R, which at its other end is held rigidly to the casing A of the stove, and preferably by screwing the air-inlet bulb K onto the threaded end of the tube outside the casing, a lock-nut $r$ being used on the tube inside the casing. (See Fig. 9 of the drawings.) At the joint of the opposite sides of the burner-sections O P are produced lateral openings $o'$, from which the burner flames into the chamber D of the stove. Generally speaking, I refer to the cross-tube of the burner by the letter $i$ and to the opposite side parts or front and rear tubular portions by letters $i'$ $i'$, as seen in Fig. 8 of the drawings. It will be understood that I prefer to form flame-apertures in the two side parts $i'$ $i'$ only of the burner and leave the cross-tube $i$ imperforate, whereby it serves not only as a fluid-fuel conduit from the mixing-tube R to both side parts or channels $i'$ $i'$ of the burner, but serves also as an extension or enlargement of the mixing-tube.

I at present prefer to clamp the upper and lower sections of the burner shown by bolts—one main bolt S at the center of the cross-tube $i$ and an auxiliary bolt $s$, passed through lugs at the four corners of the burner. Any other suitable clamping devices may be used.

To support the burner at a true level or horizontal position and as near as may be to the casing-partition or heat-deflecting plate $a'$, and also to lock the burner against endwise movement to prevent its accidental disconnection from the mixing-tube R during transportation or when in use, I have provided a bracket T and a latch U. The bracket is preferably bolted at its center to the plate $a'$, and is provided with end supports, which for the burner shown are complete rings or collars $t\,t$, into which the two burner-tubes $i'$ $i'$ may slip loosely without too free play either upward, downward, or sidewise. The latch U is preferably formed as a hook pivoted to the front end of the bracket and adapted to fall or be set behind the end of the front part of the burner. When the hook is moved or swung upward clear of the end of the burner-tube, the burner may be slipped along the bracket-supports $t\,t$ until its sleeve $o$ is clear of the mixing-tube R, which will allow it to be drawn from the bracket and removed bodily from the stove-casing to allow most convenient cleaning of the burner either by removing the bolts S $s$ and first dismembering it or in any other preferred manner. To replace the cleaned burner or to substitute a new one, it is only necessary to slip the tube $i'$ into the bracket-support $t$ and engage the sleeve $o$ with the mixing-tube R, and finally lower or move the hook-latch U behind the end of the front burner-tube $i'$, and preferably between it and the adjacent bolt $s$, to latch or lock the burner in place. If desired, a set-screw $r'$ may be used at the joint of the burner with the mixing-tube as additional security against their accidental disconnection.

In explaining the operation of the broiling-burner I state the well-known fact that all noxious uninflammable gases resulting from explosions always take the most direct course open to them in seeking escape. Now, should the supply of gas to the burner be sufficiently reduced by partially closing the cock $j$ and to an extent to form an explosive mixture of air and gas within the burner, and should such explosion occur at or near one closed end of either of the side tubes or passages $i'$, the resultant noxious gases would be forced clear to the opposite closed end of this tube or passage and beyond the central or intermediate tube or passage $i$, and would not pass through the latter and the mixing-tube to drive back the ignitible gas and cause lighting at the gas-inlet nipple $k$. On the other hand, should the gaseous mixture explode in either tube $i'$ directly opposite an open end of the cross-tube $i$, the resultant noxious non-ignitible vapors would pass directly through the tube $i$ to the other tube $i'$, and would not pass through the mixing-tube R to the air-bulb and cause lighting at the nipple $k$. Furthermore, the collection of compressed or heavy non-ignitible gases from explosions within the burner and at the junction of the cross-tube $i$ and mixing-tube R has a most decided tendency to blow out the flame, and will generally do so before it can travel backward to the gas-inlet nipple $k$ to cause ignition thereat. Hence a "lighting-back" of the burner is made quite impossible when a very low or small flame is required from it. Should a burner of larger capacity be required, it is only necessary to connect the opposite flaming-tubes $i'$ $i'$ by one, two, or more extra cross-tubes, (indicated by dotted lines in Fig. 8 of the drawings,) and having flame-apertures at the sides.

I supply the burner I and the chamber D with superheated air to maintain combustion and perfect the broiling or roasting operation by means of a chamber or passage V, formed between the casing A and a rear partition-plate W, which, by taking up heat from the burner I, heats the air, which enters suitable openings $v$ in the casing near its bottom and traverses the chamber V and escapes into the chamber D a little below the burner through holes $w$ in the partition W, as most clearly shown in Figs. 2, 6, and 8 of the drawings.

In conclusion I remark that the opposite side passages or tubes of the broiling-burner are not necessarily straight, as represented in the drawings, and as will readily be understood.

Having thus described my invention, I claim as new and desire to secure by Letters Patent—

1. A cooking-stove made with a top formed of an open or marginal frame having opposing rabbets or shoulders and separate and independent cross-bars having laterally-projecting ends resting on said shoulders, substantially as described.

2. A cooking-stove made with a top formed of an open or marginal recessed frame and separate and independent cross-bars retained loosely in the frame-recesses and having corrugated or vertically-recessed upper edges or parts, substantially as described.

3. A cooking-stove made with a top formed of an open or marginal frame having opposite rabbets or shoulders and separate and independent cross-bars having laterally-projecting ends resting on the shoulders, said bars also having corrugated or recessed upper edges or parts, substantially as described.

4. A cooking-stove made with a top formed of an open or marginal frame having opposing rabbets or shoulders with corner filling-pieces or stops thereat and separate and independent cross-bars having laterally-projecting ends resting loosely on the shoulders and stopping against each other and said corner-pieces, substantially as described.

5. The combination, with a stove wall or support and a gas-nipple connected thereto, of a burner having a horizontally-disposed stem or mixing-tube slip-jointed to the nipple, said nipple and stem having shouldered flanges projecting laterally or in about a horizontal plane to one side of them and engaging each other by a relative partial rotary movement, substantially as described.

6. The combination, with a stove wall or support, of a gas-nipple M, secured thereto and having a nozzle $m'$, and a burner having a horizontally-disposed stem or mixing-tube slip-jointed to the nozzle, said nipple and burner-stem having flanges $m^4$ $g$ projected laterally in about a horizontal plane to one side, one flange having a headed pin and the other flange having a slot engaging the pin, substantially as described.

7. A gas-stove made with a broiling-burner having a fluid-fuel channel comprising opposite side passages or tubes having flame-apertures, a crossing passage or tube connecting the side tubes intermediately of their ends, and a gas and air mixing and supply pipe opening to the crossing tube or passage, substantially as described.

8. In a gas-stove, the combination, with a broiling-burner formed with opposite side tubes or passages having flame-apertures, a crossing tube or passage connecting the side tubes intermediately of their ends, and a fluid-fuel-supply pipe connected with the crossing tube or passage, of a hanger or bracket sustaining both side tubes of the burner, substantially as described.

9. In a gas-stove, the combination, with a broiling-burner formed with opposite side tubes or passages having flame-apertures, a crossing tube or passage connecting the side tubes intermediately of their ends, and a fluid-fuel-supply pipe connected with the crossing tube or passage, of a hanger or bracket sustaining both side tubes of the burner and a latch device preventing accidental disengagement of the burner from the supply-pipe, substantially as described.

10. The combination, with the stove-casing, a fuel-feed pipe therein, and a burner having tubular side parts $i'$ $i'$ and a communicating cross-tube $i$, connected to the feed-pipe, of a bracket T, having end sleeves or rings $t$ $t$, receiving the farther ends of the burner-tubes $i'$ $i'$, substantially as described.

11. The combination, with the stove-casing, a fuel-feed pipe therein, and a burner having tubular side parts $i'$ $i'$ and a communicating cross-tube $i$, connected to the feed-pipe, of a bracket T, having sleeves or rings $t$ $t$, receiving the farther ends of the burner-tubes $i'$ $i'$, and a latch U, held to the bracket for preventing accidental disengagement of the burner and supply-pipe, substantially as described.

JAMES GIBBONS.

Witnesses:
WALTER H. BABCOCK,
LOUIS G. CLARK.